UNITED STATES PATENT OFFICE.

WESLEY G. NICHOLS, OF CHICAGO HEIGHTS, ILLINOIS, ASSIGNOR TO AMERICAN MANGANESE STEEL COMPANY, OF CHICAGO, ILLINOIS, A CORPORATION OF MAINE.

ART OF MAKING MANGANESE STEEL.

1,359,268.  Specification of Letters Patent.  Patented Nov. 16, 1920.

No Drawing.  Application filed August 15, 1918. Serial No. 249,931.

*To all whom it may concern:*

Be it known that I, WESLEY G. NICHOLS, a citizen of the United States, and a resident of Chicago Heights, county of Cook, and State of Illinois, have invented certain new and useful Improvements in the Art of Making Manganese Steel, of which the following is a specification.

This invention relates to the production of manganese steel from manganese steel scrap and other steel scrap, and has for its object to provide a new method of melting and incorporating the steel-scrap constituents of the product in a manner more economical with respect to the melting of the ordinary steel scrap, less wasteful of the manganese contained in the manganese steel scrap and more convenient, and, therefore, more economical and more thorough with respect to the bringing of the two classes of steel together.

The invention proceeds upon the principles that manganese steel may safely be heated without any special reference to environment up to about 1200° F., while ordinary steel scrap, containing manganese only in negligible quantities, may be heated with impunity up to a high state of fluidity, say 3000° F., without serious loss from deterioration, and even when fused under the severe conditions of an electric furnace; that the manganese steel may be brought to the temperature of complete fluidity if it be done in the proper environment; that the manganese steel may, without deterioration, and especially when preheated up to 1200° F., be introduced immediately into an environment having a temperature even up to its complete fusion point, provided the environment is non-oxidizing as to the contained manganese, and is adapted to completely submerge the manganese steel; that the bath of ordinary steel scrap heated up to fluidity constitutes such an environment into which the manganese steel scrap (preferably pre-heated) may be charged; and if the entire body of scrap be charged at once into the molten bath in such proportion of the whole as to give approximately the analysis desired to be obtained, the loss of manganese is greatly reduced, and the cooling of the bath resulting from the introduction of the scrap is not only not disadvantageous to the process but is advantageous because it admits of gradual bringing of the manganese to the melting point by the gradual restoring of the temperature of the bath and finally, the alloy may be rectified by supplying the ascertained deficiency of manganese and draw the metal into molds for ingots or commercial castings, as circumstances may dictate.

It has already been proposed to melt manganese steel scrap in a separate furnace having a non-oxidizing environment, such as the electric furnace, also in certain oil-fired furnaces, and to then combine this molten metal with decarburized metal from a converter or open-hearth furnace. But this process also requires a separate furnace or cupola for melting the ferro-manganese to alloy the decarburized metal from the converter or open-hearth furnace, besides involving the complete pre-melting of the manganese scrap. By my present invention I eliminate the converter, open-hearth furnace, and cupola, and resort to but a partial melting in the step of preheating the manganese steel scrap, thereby saving the large loss of metallic manganese. By use of the term "partial melting" is meant that the manganese steel scrap is heated to such a point as to be heated thoroughly throughout, when the scrap becomes mushy, without turning into a fluid state. The partial melting is accomplished preferably by heating the manganese scrap in a separate furnace at such a temperature that oxidation of the manganese is prevented while at the same time the scrap is heated throughout. It is a well-known characteristic of manganese that it oxidizes at a temperature much lower than that necessary to melt ordinary carbon steel; consequently any preheating or partial melting of the manganese scrap must be carried out under such conditions that the oxidation of the manganese therein is prevented, while at the same time thorough heating is accomplished.

It has also been proposed to melt a low-carbon (not over .50% carbon) steel scrap with the manganese steel scrap, and then add to the bath sufficient ferro-manganese to alloy the low-carbon steel scrap. But this process is not commercially practicable for the reason that the temperature required to melt the low-carbon steel scrap will cause an oxidation of the manganese in the manganese steel scrap and thereby render the process uneconomical. Numerous other methods have also been suggested, but all of them, so far as I am aware, involve wasteful oxidation of the manganese, and are therefore commercially impracticable.

According to one illustrative embodiment of my present invention, I start with a low phosphorus, low sulfur, and low silicon steel scrap with a carbon content of not over .50%. This cold steel I charge into an electric furnace, and there melt the same. In doing this high voltage may be employed if so desired, as none of the elements present in this steel scrap will be injured thereby. The manganese present in the scrap will be of such low percentage that it need not be taken into consideration. Immediately this charge is melted, a good covering of slag will generally have formed; but if found not to have been formed, a slag forming material will be charge in sufficient quantity to insure a covering for the entire bath. I now increase the temperature of the bath to approximately 3000° F. When this temperature is reached, I charge into the fluid bath so prepared a predetermined amount of preheated (to a temperature not exceeding 1200° F.) manganese steel scrap. This should be in such sizes that none of the pieces will project out of the bath but will remain submerged in order to prevent oxidation of the contained manganese. So long as the pieces of the manganese steel scrap are under the slag covering there will be practically no oxidation as said slag covering will protect the manganese.

The manganese steel scrap, when charged, will at once absorb sufficient heat from the steel bath to cause a disintegration of the pieces, and the bath will constitute an environment that submerges the charged manganese steel and prevents an oxidation of the manganese. When the scrap reaches a molten state, I increase the temperature of the furnace until the entire mass becomes fluid. When this stage is reached I charge a sufficient quantity of ferro-manganese to bring the alloy up to analysis, which will generally be a quantity appropriate to alloy the steel scrap originally charged. I then raise the temperature of the furnace and metal to approximately 3000° F., doing this by slow stages in order that the ferro-manganese will be entirely melted when the temperature of 3000° F. is reached, which temperature is sufficiently high to pour ingots or molds. If it should be found that the ferro-manganese or possibly the manganese steel scrap is not entirely melted, the furnace can be held at this temperature until the entire bath is of proper fluidity to tap. This can be done without danger of oxidation as I maintain a slag covering which will protect the manganese at all times.

A short time before the furnace is to be tapped, I may charge a reducing agent into the furnace, such as coal, coke, charcoal, or any carbonaceous material or silicon or aluminum, that will combine with the oxygen without having an injurious effect on the steel, in order to drive back into the bath that portion of manganese picked up by the slag during the process of reduction. A number of advantages will be obvious in the new process. No refining of the steel scrap is required. The elements are in such proportions that no injurious effects will be had in the finished product. Practically no oxidation of the metallic manganese in the manganese steel scrap or the ferro-manganese will take place, it being a known fact that oxidation of manganese in manganese steel scrap, or in ferro-manganese is practically eliminated if these substances are entirely protected by a slag covering during the process of melting. This slag covering is obtained in the melting operation of the steel scrap in the present invention, and the manganese steel scrap and ferro-manganese, when charged into the bath will be entirely submerged therein.

This invention eliminates in the manufacture of manganese steel castings, the converter and cupola in the Bessemer and Tropenas process and the furnaces in the open-hearth process. It also eliminates a separate furnace or cupola for melting the ferro-manganese, thereby saving a melting loss of manganese which is never under 5% in former practice.

What I claim is:

1. The improvement in the art of recovering manganese steel from scrap, which consists in charging ordinary steel scrap into an electric furnace, then delivering, in a single charge, into the molten bath of ordinary steel all of the manganese steel scrap to be incorporated, and then heating the bath by slow stages until the temperature thereof is restored to the melting point of manganese steel; ferro-manganese being added in sufficient quantity to produce with the resultant bath an alloy of approximately the analysis desired.

2. The improvement in the art of recovering manganese steel from scrap, which consists in charging ordinary steel scrap into an electric furnace, then preheating the manganese steel scrap to about 1200° F. and then delivering, as a single charge into the molten bath of ordinary steel, all of the preheated manganese steel scrap to be incorporated, and then raising the temperature of the bath by slow stages to the melting point of manganese steel; ferro-manganese being added in proportion sufficient to bring the ultimate analysis up to substantially that required.

3. The art of making manganese steel which consists in charging carbon steel scrap into a furnace in which an inert environment is maintained, then melting this scrap, next charging into the bath of molten carbon steel scrap preheated pieces of manganese scrap, the pieces being sufficiently small to be readily submerged in the bath, then restoring the temperature of the bath to the melting point of manganese steel, then adding ferro-manganese in proportions sufficient to impart to the resultant bath approximately the analysis of the manganese steel desired, and heating the bath to the point of fluidity for tapping.

4. The herein described process of producing manganese steel, which consists in charging ordinary steel scrap into an electric furnace, then preparing a molten bath of ordinary steel at a temperature of about 3000° F., charging thereinto manganese steel scrap preheated to a temperature of about 1200° F., maintaining submergence of the manganese steel scrap in said bath, and maintaining the temperature of the resultant aggregate up to the melting point of the manganese steel and until it is fused.

5. The herein described process of producing manganese steel, which consists in charging ordinary steel scrap into an electric furnace, then preparing a molten bath of ordinary steel at a temperature of about 3000° F., charging thereinto manganese steel scrap preheated to a temperature of about 1200° F., maintaining submergence of the manganese steel in said bath, maintaining the temperature of the resultant aggregate up to the melting point of the manganese steel until it is fused, then raising the temperature of the bath to fluidity and drawing the metal.

6. The herein described process of producing manganese steel, which consists in charging ordinary steel scrap into an electric furnace, then preparing a molten bath of ordinary steel at a temperature of about 3000° F., charging thereinto manganese steel scrap preheated to about 1200° F., and under conditions that maintain submergence of the manganese steel in the bath, also charging ferro-manganese into the bath in quantity sufficient to produce the desired analysis of the resultant manganese steel alloy, maintaining the temperature of the bath up to the melting point until the manganese steel scrap and ferro-manganese are thoroughly melted and incorporated in the bath, and finally bringing it to a temperature of complete fluidity and drawing the metal.

Signed at Chicago Heights, Illinois, this 9th day of August, 1918.

WESLEY G. NICHOLS.